United States Patent
Yoshida et al.

(10) Patent No.: US 7,550,360 B2
(45) Date of Patent: Jun. 23, 2009

(54) SOLID ELECTROLYTIC CAPACITOR MANUFACTURING METHOD CAPABLE OF EASILY AND PROPERLY CONNECTING ANODE ELECTRODE PORTION

(75) Inventors: Yuji Yoshida, Miyagi (JP); Katsuhiro Yoshida, Miyagi (JP)

(73) Assignee: NEC TOKIN Corporation, Sendai-shi (JP)

( * ) Notice: Subject to any disclaimer, the term of this patent is extended or adjusted under 35 U.S.C. 154(b) by 0 days.

(21) Appl. No.: 11/820,304

(22) Filed: Jun. 18, 2007

(65) Prior Publication Data

US 2007/0297121 A1    Dec. 27, 2007

(30) Foreign Application Priority Data

Jun. 22, 2006    (JP) .............................. 2006-172511

(51) Int. Cl.
*H01L 21/20* (2006.01)
(52) U.S. Cl. .............. 438/399; 29/25.03; 257/E21.517; 257/E23.148; 257/E23.15
(58) Field of Classification Search ................. 361/503, 361/502, 517, 518, 519, 514, 524, 521, 520, 361/538, 522, 541, 539, 320, 523, 534; 438/29, 438/257; 257/320, 525, 361, 277, 7; 29/25.01
See application file for complete search history.

(56) References Cited

U.S. PATENT DOCUMENTS

| | | | | |
|---|---|---|---|---|
| 4,831,494 | A * | 5/1989 | Arnold et al. ............. | 361/306.3 |
| 5,377,073 | A * | 12/1994 | Fukaumi et al. ............. | 361/540 |
| 6,392,869 | B2 * | 5/2002 | Shiraishi et al. ............. | 361/523 |
| 6,426,866 | B2 * | 7/2002 | Shoji et al. ................. | 361/523 |
| 6,563,693 | B2 * | 5/2003 | Nakada et al. ............. | 361/523 |
| 6,865,070 | B2 * | 3/2005 | Arai et al. ................... | 361/523 |
| 6,909,596 | B2 * | 6/2005 | Shimoyama et al. ........ | 361/523 |
| 6,920,035 | B2 * | 7/2005 | Nagasawa et al. ........... | 361/523 |
| 6,970,344 | B2 * | 11/2005 | Arai et al. .................... | 361/528 |
| 6,977,807 | B2 * | 12/2005 | Arai et al. .................... | 361/523 |
| 6,989,982 | B2 * | 1/2006 | Kobayashi et al. .......... | 361/523 |
| 7,042,709 | B2 * | 5/2006 | Kobayashi et al. .......... | 361/523 |
| 7,139,162 | B2 * | 11/2006 | Michel et al. ................ | 361/508 |
| 7,326,261 | B2 * | 2/2008 | Nagasawa et al. ........... | 29/25.03 |
| 7,342,772 | B2 * | 3/2008 | Tadanobu et al. ............ | 361/523 |
| 7,347,880 | B2 * | 3/2008 | O'Phelan et al. ............ | 29/25.03 |

(Continued)

FOREIGN PATENT DOCUMENTS

JP    09-036003 A1    2/1997

(Continued)

*Primary Examiner*—N Drew Richards
*Assistant Examiner*—Ankush K Singal
(74) *Attorney, Agent, or Firm*—Frishauf, Holtz, Goodman & Chick, P.C.

(57) ABSTRACT

In a method of manufacturing a solid electrolytic capacitor, at first, an anodic oxide film is formed on the surface of an aluminum base. Then, a solid electrolyte layer is formed of a conductive polymer or the like on the anodic oxide film. Then, a cathode electrode portion including a silver paste layer is formed on the solid electrolyte layer. Then, a conductive paste is coated on the anodic oxide film on one side of the aluminum base and cured, thereby forming a metal silver layer. Then, a laser beam is irradiated from the opposite side of the aluminum base to weld together the aluminum base and the metal silver layer, thereby forming an anode electrode portion.

10 Claims, 3 Drawing Sheets

U.S. PATENT DOCUMENTS

| | | | |
|---|---|---|---|
| 2001/0020319 A1* | 9/2001 | Farahmandi et al. | 29/25.03 |
| 2003/0007311 A1* | 1/2003 | Kojima et al. | 361/302 |
| 2003/0053286 A1* | 3/2003 | Masuda et al. | 361/523 |
| 2004/0027789 A1* | 2/2004 | Kochi et al. | 361/523 |
| 2004/0264111 A1* | 12/2004 | Shimoyama et al. | 361/523 |
| 2005/0225930 A1* | 10/2005 | Stieglbauer et al. | 361/523 |
| 2006/0012942 A1* | 1/2006 | Poplett | 361/301.4 |
| 2006/0018084 A1* | 1/2006 | Saito et al. | 361/523 |
| 2006/0109609 A1* | 5/2006 | Kobayashi et al. | 361/523 |
| 2006/0120023 A1* | 6/2006 | Kobayashi et al. | 361/523 |
| 2006/0262490 A1* | 11/2006 | Saitou et al. | 361/540 |
| 2007/0159771 A1* | 7/2007 | Saito et al. | 361/528 |

FOREIGN PATENT DOCUMENTS

JP   10-163072 A1   6/1998

\* cited by examiner

SOLID ELECTROLYTIC CAPACITOR MANUFACTURING METHOD CAPABLE OF EASILY AND PROPERLY CONNECTING ANODE ELECTRODE PORTION

This application is based upon and claims the benefit of priority from Japanese patent application No. 2006-172511, filed on Jun. 22, 2006, the disclosure of which is incorporated herein in its entirety by reference.

BACKGROUND OF THE INVENTION

This invention relates to a method of manufacturing a thin-type solid electrolytic capacitor using a flat plate-shaped aluminum foil or the like and, in particular, relates to a method of manufacturing a solid electrolytic capacitor having a low impedance.

In recent years, digital devices have decreased in size and increased in functionality and high-frequency driven power supplies have been rapidly increasing. Following it, there has been an increasing demand for noise countermeasures and smoothing of power supply voltages and, thus, the roles of electrolytic capacitors in electronic circuits have been getting important. In such a background, electrolytic capacitors are strongly required to be small in size, large in capacitance, and low in ESR (Equivalent Series Resistance) or low in impedance.

However, a conventional electrolytic capacitor using a liquid or solid electrolyte (manganese dioxide or the like) is inferior to a multilayer ceramic capacitor in characteristic in a high frequency region and thus cannot sufficiently satisfy the foregoing requirement.

For example, Japanese Unexamined Patent Application Publication (JP-A) No. Hei 10-163072 or Japanese Unexamined Patent Application Publication (JP-A) No. Hei 09-36003 discloses a multilayer solid electrolytic capacitor formed by stacking a plurality of solid electrolytic capacitors each using as a solid electrolyte a conductive polymer film formed on a dielectric oxide film and each using aluminum as an anode body. Electrical connection between anode electrode portions of the solid electrolytic capacitors or between anode electrode portions and lead frames of the solid electrolytic capacitors is carried out by electrical spot welding, laser welding, or the like.

SUMMARY OF THE INVENTION

In this type of solid electrolytic capacitor, the resistivity of a conductive polymer is lower by one or two digits as compared with that of a conventional liquid or solid electrolyte. Therefore, by setting the rate of a cathode electrode portion accounting for in the whole to be large and setting the rate of an anode electrode portion accounting for in the whole to be small, it is possible to achieve a low impedance equivalent to that of a multilayer ceramic capacitor in a high frequency region.

However, if the anode electrode portion is small, damage to a dielectric oxide film tends to occur by a welding operation to the anode electrode portion and thus there may occur a case where the leakage current of the solid electrolytic capacitor increases. In addition, unless the welding is performed by accurately positioning welding points so as to be adapted to the size of the anode electrode portion, its connection strength becomes insufficient.

In the case of laser welding, a proper connection strength and connection resistance can be achieved only when welding objects sufficiently adhere to each other. Therefore, in the case where the adhesion between the welding objects is not sufficient, the connection strength at the anode electrode portion after the laser welding may become small or the connection resistance at the anode electrode portion after the laser welding may become large.

It is therefore an exemplary object of this invention to provide a solid electrolytic capacitor manufacturing method capable of easily and properly connecting an anode electrode portion.

Other objects of the present invention will become clear as the description proceeds.

According to an exemplary aspect of this invention, there is provided a method of manufacturing a solid electrolytic capacitor comprising a surface-roughened flat plate-shaped metal base, an anodic oxide film formed by anodic oxidation on a surface of the metal base, a solid electrolyte layer formed of a conductive polymer at at least a portion on the anodic oxide film, a cathode electrode portion formed on the solid electrolyte layer, and an anode electrode portion formed at a portion, where the solid electrolyte layer is not provided, of the metal base, the method comprising coating a conductive paste on the anodic oxide film on one side of the metal base and curing the conductive paste coated, thereby forming a metal layer, and irradiating a laser beam from a side, opposite to the one side where the conductive paste is coated, of the metal base to weld together the metal base and the metal layer, thereby forming the anode electrode portion.

According to another exemplary aspect of this invention, there is provided a method of manufacturing a solid electrolytic capacitor, the method comprising preparing a plurality of capacitor elements each in the form of the solid electrolytic capacitor manufactured by the method mentioned in the above clause, and bonding together the anode electrode portions of the plurality of capacitor elements using a conductive adhesive.

According to still another exemplary aspect of this invention, there is provided a method of manufacturing a solid electrolytic capacitor comprising a plurality of capacitor elements each comprising a surface-roughened flat plate-shaped metal base, an anodic oxide film formed by anodic oxidation on a surface of the metal base, a solid electrolyte layer formed of a conductive polymer at at least a portion on the anodic oxide film, a cathode electrode portion formed on the solid electrolyte layer, and an anode electrode portion formed at a portion, where the solid electrolyte layer is not provided, of the metal base, the method comprising coating a conductive paste on the anodic oxide film on one side of the metal base and curing the conductive paste coated, thereby forming a metal layer in each of the plurality of capacitor elements, and irradiating a laser beam from a side, opposite to the one side where the conductive paste is coated, of the metal base to weld together the metal base and the metal layer, thereby forming the anode electrode portion in each of the plurality of capacitor elements.

DESCRIPTION OF THE PREFERRED EMBODIMENTS

Figure 1:
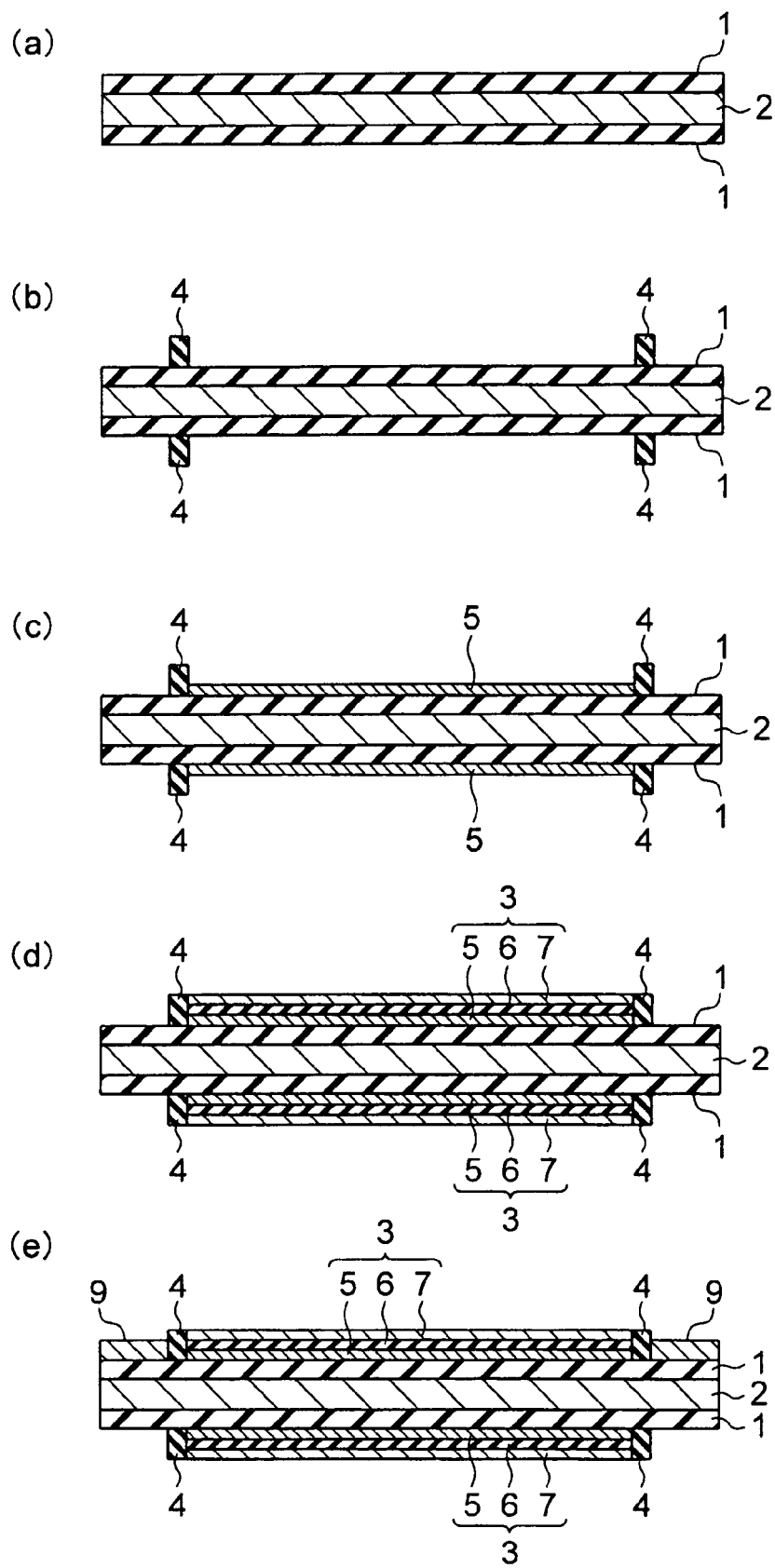
FIG. 1 is a process diagram for explaining a solid electrolytic capacitor manufacturing method according to exemplary embodiment 1 of this invention.
Figure 2:
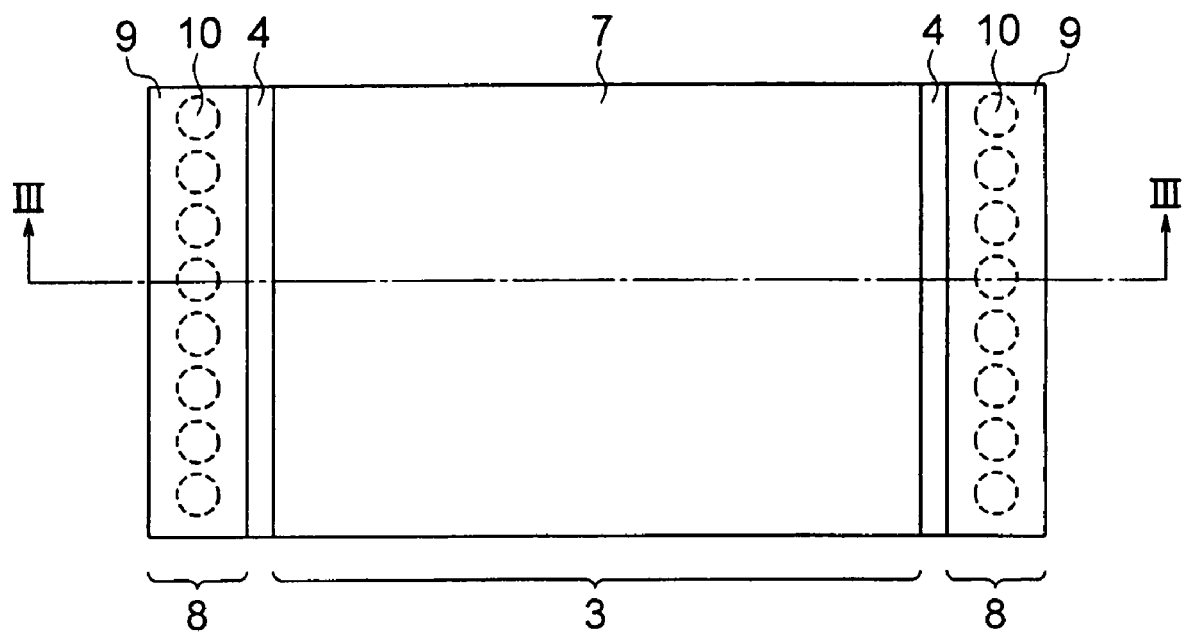
FIG. 2 is a plan view of a solid electrolytic capacitor manufactured by the manufacturing method explained with reference to FIG. 1.

Referring to FIGS. 1 and 2, description will be made about a solid electrolytic capacitor manufacturing method according to exemplary embodiment 1.

At first, a flat plate-shaped metal base, specifically, a flat plate-shaped aluminum base 2 is prepared to have surfaces roughened by porosity formation. As shown in (a) of FIG. 1, anodic oxide films 1 are formed by anodic oxidation on the surfaces of the flat plate-shaped aluminum base 2, respectively. Then, as shown in FIG. 1, (b), two insulator layers 4 made of an epoxy resin or the like are formed at predetermined positions on the anodic oxide film 1, specifically, near both end portions of the anodic oxide film 1. Then, as shown in FIG. 1, (c), a solid electrolyte layer 5 is formed of a conductive polymer at at least a portion on each of the anodic oxide films 1, specifically, in a region between the two insulator layers 4 on the surfaces of the anodic oxide film 1. Further, as shown in FIG. 1, (d), a graphite layer 6 and a silver paste layer 7 are formed on each solid electrolyte layer 5 in the order named, thereby forming a cathode electrode portion 3 on each electrolyte layer 5. Subsequently, as shown in FIG. 1, (e), a silver paste being a conductive paste is coated on the anodic oxide film 1 on one side of the aluminum base 2 and then cured, thereby forming metal silver layers 9 at both end portions of the anodic oxide film 1, respectively.

Figure 3:
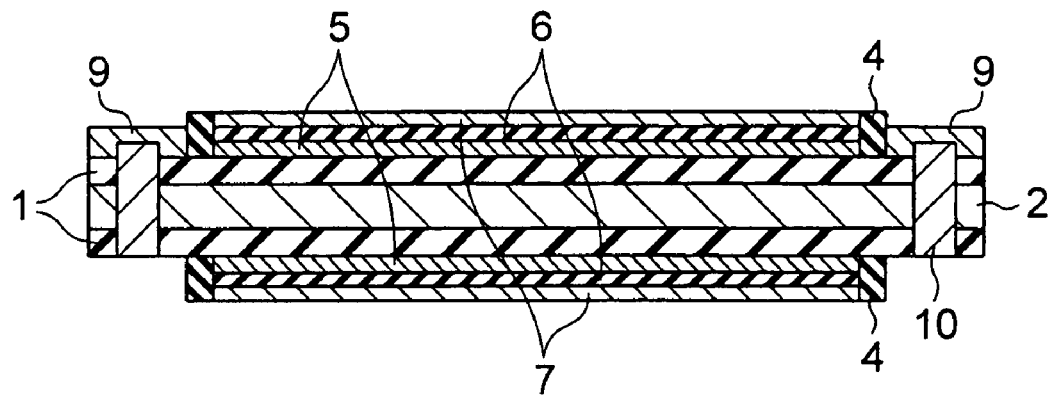
FIG. 3 is a sectional view taken along line III-III in FIG. 2.

Finally, a laser beam is irradiated from the side, opposite to the side where the conductive paste is coated, of the aluminum base 2 to fusion-bond or weld together the aluminum base 2 and each of the metal silver layers 9 at a plurality of welding portions 10, thereby forming anode electrode portions 8 as shown in FIGS. 2 and 3.

Specifically, a solid electrolytic capacitor was manufactured by a manufacturing method which will be described hereinbelow.

An aluminum base 2 formed with porous anodic oxide films 1 by setting a chemical conversion voltage to 3V and having a unit area capacitance of 270 $\mu F/cm^2$ and a thickness of 70 microns was cut into a shape with a width of 4.2 mm and a length of 5 mm. Insulator layers 4 were formed so as to allow cathode electrode portions 3 to have a width of 4.2 mm and a length of 3.5 mm. The insulator layers 4 each had a width of 0.25 mm and a thickness of 30 $\mu m$ and were formed by screen printing of an epoxy resin. On each of the anodic oxide films 1, a solid electrolyte layer 5 of a conductive polymer having a conductivity of 50 S/cm or more was formed by reacting pyrrole as a monomer, ammonium peroxodisulfate as an oxidant, and paratoluenesulfonic acid as a dopant at the composition ratio of 6:1:2, respectively. On each solid electrolyte layer 5, a graphite layer 6 having a thickness of 10 $\mu m$ and a silver paste layer 7 having a thickness of 30 $\mu m$ were coated in the order named by screen printing. Thus, each of the cathode electrode portions 3 was formed to comprise the solid electrolyte layer 5, the graphite layer 6, and the silver paste layer 7.

Subsequently, a silver paste was coated by screen printing on the anodic oxide film 1 on one side of the aluminum base 2 and then cured, thereby forming metal silver layers 9. Further, the aluminum base 2 and each of the metal silver layers 9 were welded together by perpendicularly irradiating a YAG laser beam onto the opposite side, i.e. the lower side in FIG. 1, (e), of the aluminum base 2, thereby forming anode electrode portions 8.

Here, a description will be given of one example of specific manufacturing conditions and shapes for the manufacture of the anode electrode portions 8. In substantially the entire regions on one side of the anodic oxide film 1 at the anode electrode portions 8, a conductive paste containing 20 to 30% organic silver and containing, as a filler, silver oxide particles having a particle size of 1 $\mu m$ or less is coated using a screen mask so that the thickness of the coated conductive paste after curing becomes 10 to 20 microns. By curing this conductive paste at a temperature of 150° C. or more, the metal silver layers 9 are obtained through a reaction between the organic silver and the silver oxide. In each metal silver layer 9 after the curing, the content of remaining organic components is 3.5%. Subsequently, from the side, where the conductive paste is not coated, of the anodic oxide film 1 at the anode electrode portions 8, a laser beam having a diameter of 0.4 mm and an energy of 0.036 J is irradiated, using a YAG laser, onto the anodic oxide film 1 at eight portions for each anode electrode portion 8, three times at each of the eight portions. As a result, each of the film-shaped metal silver layers 9 and the aluminum base 2 are welded together through welding portions 10 penetrating the anodic oxide film 1. In this event, as shown in FIG. 3, the welding portions 10 each have a hole shape penetrating from the laser irradiation side to the metal silver layer 9.

Thereafter, each of the anode electrode portions 8 and an external anode terminal, and the cathode electrode portion 3 and an external cathode terminal were bonded together using a conductive paste such as a conductive adhesive. Further, all portions other than drawing portions of the external anode terminals and the external cathode terminal were molded by a resin, thereby obtaining a solid electrolytic capacitor. The obtained solid electrolytic capacitor had characteristics such that the capacitance at a frequency of 120 Hz was 25 $\mu F$, the ESR at a frequency of 100 kHz was 10 m$\Omega$, and the leakage current was 5 $\mu A$. It was confirmed that the obtained solid electrolytic capacitor was small in size and had low impedance characteristics and, further, the anode electrode portions had sufficient strength.

According to the foregoing solid electrolytic capacitor, since each metal silver layer 9 formed of the coated conductive paste and the aluminum base 2 adhere to each other, sufficient connection strength is obtained. Further, since each metal silver layer 9 is mostly formed of the conductive filler in the conductive paste, the electrical resistance between the welded metal silver layer 9 and aluminum base 2 is small. Therefore, it is possible to realize the aluminum solid electrolytic capacitor that achieves both a reduction in size and a reduction in impedance.

In the case where the metal silver layer 9 contains a large amount of resin components, there is a possibility that the resin components burn due to laser irradiation to cause characteristic degradation of an electrolytic capacitor due to abnormality in welding shape, an increase in connection resistance, and so on. For this reason, it is preferable to use a conductive paste such that the content of organic components remaining in the paste after curing becomes less than 5%, preferably 4% or less. As examples of such a conductive paste, there are cited a nano silver paste in the form of silver particles of 0.1 $\mu m$ or less in size, an organic silver paste, a mixed paste of organic silver and silver oxide, and so on.

For comparing the influences of organic components in conductive pastes, a solid electrolytic capacitor as a comparative capacitor was manufactured using a conductive paste such that the content of organic compounds remaining in a metal silver layer 9 after curing at 150° C. or more is 5%. The welding shape abnormality rates and the electrical resistances at the anode electrode portions after the laser irradiation were evaluated and compared between the solid electrolytic capacitor (herein called "exemplary embodiment 1") manufactured by the manufacturing method according to exemplary embodiment 1 and the comparative capacitor. The comparison results are shown in Table 1.

TABLE 1

|  | Content of Organic Compound (%) | Welding Shape Abnormality Rate (%) | Electrical Resistance at Anode Electrode Portion (Average) (mΩ) |
| --- | --- | --- | --- |
| Exemplary Embodiment 1 | 3.5 | 1 | 0.540 |
| Comparative Capacitor | 5.0 | 89 | 2.702 |

From Table 1, it is understood that, in exemplary embodiment 1, the welding shape abnormality rate is smaller and the electrical resistance at the anode electrode portion 8 is clearly reduced as compared with the comparative capacitor.

Figure 4:
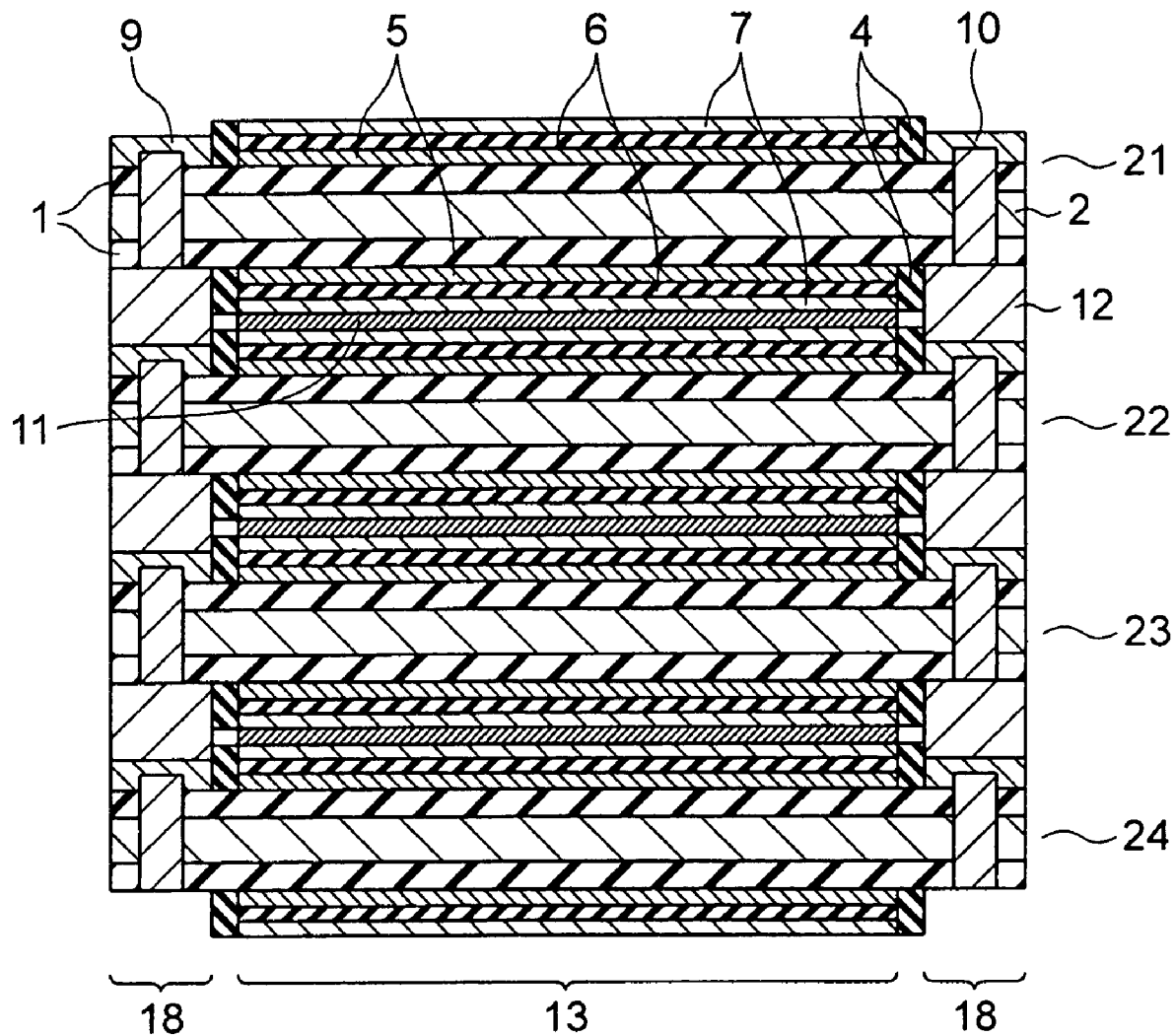
FIG. 4 is a sectional view, similar to FIG. 3, of a multilayer solid electrolytic capacitor manufactured by a manufacturing method according to exemplary embodiment 2 of this invention.

FIG. 4 shows a solid electrolytic capacitor manufactured by a manufacturing method according to exemplary embodiment 2. This solid electrolytic capacitor comprises four solid electrolytic capacitors 21, 22, 23, and 24. Since each of the four solid electrolytic capacitors 21, 22, 23, and 24 is manufactured by the manufacturing method described with reference to FIG. 1 and thus includes an aluminum base, such a solid electrolytic capacitor may also be hereinafter referred to as a "four-layer aluminum solid electrolytic capacitor".

In each of the solid electrolytic capacitors 21, 22, 23, and 24, a silver paste being a conductive paste was coated on an anodic oxide film 1 on one side of an aluminum base 2 and then cured, thereby forming metal silver layers 9. Further, a laser beam is irradiated from the side, opposite to the side where the conductive paste is coated, of the aluminum base 2 to weld together the aluminum base 2 and each of the metal silver layers 9, thereby forming anode electrode portions 18. For example, in the solid electrolytic capacitor 21, each of the metal silver layers 9 and the aluminum base 2 covered with the anodic oxide film 1 were welded together, thereby forming welding portions 10.

Then, a cathode electrode portion of the solid electrolytic capacitor 21 and a cathode electrode portion of the solid electrolytic capacitor 22 were bonded together using a conductive adhesive 11. The welding portions 10 of the anode electrode portions were simultaneously bonded using a similar conductive adhesive 12. In this event, since part of the conductive adhesive 12 was filled into the through hole-like welding portions 10, the anode electrode portions of the solid electrolytic capacitor 21 and the anode electrode portions of the solid electrolytic capacitor 22 were also electrically connected together.

The four solid electrolytic capacitors were stacked together by repeating the same process, thereby completing upper and lower cathode electrode portions 13 and anode electrode portions 18 of the four-layer aluminum solid electrolytic capacitor. Thereafter, each of the anode electrode portions 18 and an external anode terminal, and the cathode electrode portions 13 and an external cathode terminal were bonded together using a conductive adhesive. Further, all portions other than drawing portions of the external anode terminals and the external cathode terminal were molded by a resin, thereby obtaining the four-layer aluminum solid electrolytic capacitor.

The obtained four-layer aluminum solid electrolytic capacitor had characteristics such that the capacitance at a frequency of 120 Hz was 100 μF, the ESR at a frequency of 100 kHz was 5 mΩ, and the leakage current was 20 μA. It was confirmed that the obtained four-layer aluminum solid electrolytic capacitor was small in size and had low impedance characteristics and, further, the anode electrode portions had sufficient strength.

The conductive paste may be arranged such that the content of organic components remaining in the conductive paste after curing is less than 5%.

The method may be arranged to comprise connecting an external anode terminal to the anode electrode portion using a conductive adhesive.

The method may be arranged to comprise bonding together the cathode electrode portions of the plurality of capacitor elements using a conductive adhesive.

The conductive paste may be arranged such that the content of organic components remaining in the conductive paste after curing is less than 5%.

The method may be arranged to comprise connecting an external anode terminal to at least one of the anode electrode portions of the plurality of capacitor elements using a conductive adhesive.

The method may be arranged to comprise bonding together the anode electrode portions of the plurality of capacitor elements using a conductive adhesive.

The method may be arranged to comprise bonding together the cathode electrode portions of the plurality of capacitor elements using a conductive adhesive.

While the description has been made in terms of exemplary embodiments, the invention is not to be limited thereto. For example, the layered structure, the thicknesses and materials of respective layers, the external shape, the shapes of cathode and anode electrode portions and laser irradiated portions, and so on of a solid electrolytic capacitor, to which this invention is applied, can be changed depending on the required shape and characteristics and so on of the solid electrolytic capacitor.

What is claimed is:

1. A method of manufacturing a solid electrolytic capacitor comprising a surface-roughened flat plate-shaped metal base, an anodic oxide film formed by anodic oxidation on a surface of the metal base, a solid electrolyte layer formed of a conductive polymer at at least a portion on the anodic oxide film, a cathode electrode portion formed on the solid electrolyte layer, and an anode electrode portion formed at a portion, where the solid electrolyte layer is not provided, of the metal base, the method comprising:

coating a conductive paste on the anodic oxide film on one side of the metal base and curing the conductive paste coated, thereby forming a metal layer; and irradiating a laser beam from a side, opposite to the one side where the conductive paste is coated, of the metal base to weld together the metal base and the metal layer, thereby forming the anode electrode portion.

2. The method according to claim 1, wherein the conductive paste is such that the content of organic components remaining in the conductive paste after curing is less than 5%.

3. The method according to claim 1, comprising connecting an external anode terminal to the anode electrode portion using a conductive adhesive.

4. A method of manufacturing a solid electrolytic capacitor, the method comprising:

preparing a plurality of capacitor elements each in the form of the solid electrolytic capacitor manufactured by the method according to claim 1; and bonding together the anode electrode portions of the plurality of capacitor elements using a conductive adhesive.

5. The method according to claim 4, comprising bonding together the cathode electrode portions of the plurality of capacitor elements using a conductive adhesive.

6. A method of manufacturing a solid electrolytic capacitor comprising a plurality of capacitor elements each comprising a surface-roughened flat plate-shaped metal base, an anodic oxide film formed by anodic oxidation on a surface of the metal base, a solid electrolyte layer formed of a conductive polymer at at least a portion on the anodic oxide film, a cathode electrode portion formed on the solid electrolyte layer, and an anode electrode portion formed at a portion, where the solid electrolyte layer is not provided, of the metal base, the method comprising:

coating a conductive paste on the anodic oxide film on one side of the metal base and curing the conductive paste coated, thereby forming a metal layer in each of the plurality of capacitor elements; and irradiating a laser beam from a side, opposite to the one side where the conductive paste is coated, of the metal base to weld together the metal base and the metal layer, thereby forming the anode electrode portion in each of the plurality of capacitor elements.

7. The method according to claim 6, wherein the conductive paste is such that the content of organic components remaining in the conductive paste after curing is less than 5%.

8. The method according to claim 6, comprising connecting an external anode terminal to at least one of the anode electrode portions of the plurality of capacitor elements using a conductive adhesive.

9. The method according to claim 6, comprising bonding together the anode electrode portions of the plurality of capacitor elements using a conductive adhesive.

10. The method according to claim 6, comprising bonding together the cathode electrode portions of the plurality of capacitor elements using a conductive adhesive.

* * * * *